United States Patent [19]
Froehling

[11] 3,739,188
[45] June 12, 1973

[54] COMMON WIRE COMPENSATION CIRCUIT

[75] Inventor: Paul H. Froehling, Franklin, Wis.

[73] Assignee: Johnson Service Company, Milwaukee, Wis.

[22] Filed: Oct. 22, 1971

[21] Appl. No.: 191,737

[52] U.S. Cl. .............................................. 307/103
[51] Int. Cl. ............................................. H02j 3/12
[58] Field of Search ..................... 307/103; 322/21, 322/17

[56] References Cited
UNITED STATES PATENTS
2,651,773   9/1953   Loudon ........................... 307/103 X
3,541,462   11/1970   Sarkisan et al. ...................... 330/9

Primary Examiner—Robert K. Schaefer
Assistant Examiner—Morris Ginsburg
Attorney—John A. Dienner, Arthur C. Johnson, John A. Dienner, Jr. et al.

[57] ABSTRACT

In an electrical control system having equipment at different locations interconnected by a multi-wire cable including a common wire which links points of reference potential for the equipment, a compensating circuit samples current flowing in the common wire such that whenever a potential difference exists between the reference points a current is generated in a compensating wire which is extended to one of the points of reference potential to minimize the current flow in the common wire thereby equalizing the potentials at the reference points.

6 Claims, 2 Drawing Figures

Patented June 12, 1973

3,739,188

INVENTOR
PAUL H. FROEHLING

BY Johnson Dienner Emrich Verbeck & Wagner

ATTYS.

COMMON WIRE COMPENSATION CIRCUIT

BACKGROUND OF THE INVENTION

1. Field of the Invention

This invention relates to wiring arrangements in electrical systems, and more particularly, to a compensating circuit for minimizing current flow over a common wire of a multi-wire connection circuit.

2. Description of the Prior Art

Many electrical control systems, as well as other types of electrical and electronic systems, have equipment at several widely spaced locations which is interconnected by multi-wire cables. In such wiring arrangements, one wire in the cable is a common wire for signals on many of the other wires in the cable. The common wire links points of reference potential for circuits or apparatus which comprise the equipment at different locations in the system.

However, since the common wire is common to many circuits, the current in the common wire can become quite large causing a potential difference to exist between points of reference potential. Moreover, changes in the current flowing over the common wire can also be quite large when many signals change simultaneously. The presence of this potential difference between reference points caused by current flowing over the common wire presents problems to the system designer because in such cases the common wire no longer provides a stable reference potential for all of the circuits of the electrical system.

To minimize the voltage drop and changes in voltage along the common wire which result from current flow in the common wire, many electrical systems employ large gauge wire for the common wire or use a plurality of wires for the common wire to minimize the resistance of the common wire. Although such approaches are effective for low currents to minimize the potential difference between the reference points, at higher currents, a significant potential difference may exist between reference points interconnected by the common wire. In addition, the use of a larger gauge wire, particularly when used to interconnect equipment at locations large distances apart, can add a considerable amount to the cost of the system.

SUMMARY OF THE INVENTION

The present invention provides a compensating circuit for use in electrical or electronic systems having equipment at different locations interconnected by a multi-wire cable which includes a common wire means for interconnecting reference points at the locations.

The compensating circuit includes means for sampling the current flowing in the common wire means whenever a potential difference exists between reference points due to a change in potential at one of the reference points. In response to current flow over the common wire means, the compensating circuit provides a compensating current which is extended to one of the reference points to reduce the current in the common wire means and thereby compensate for the change in potential at such reference point substantially eliminating the potential difference between the reference points.

In one embodiment, the compensating circuit includes a sensing resistor connected in series with a common wire of the multiwire cable which interconnects points of reference potential for equipment at different locations such that current flowing over the common wire also flows through the sensing resistor and produces a voltage drop across the sensing resistor.

The compensating circuit further includes voltage sensing means which is comprised of an amplifier circuit having differential inputs connected across the sensing resistor and an output connected over a compensating wire to one of the points of reference potential. Accordingly, whenever current is flowing over the common wire and the sensing resistor, a voltage is provided at the input of the amplifier circuit. The voltage input to the amplifier is amplified and inverted to provide an offset voltage to generate a current which is fed back to one of the points of reference potential, reducing the current in the common wire and thereby minimizing the potential difference between the reference points interconnected by the common wire.

Current flow over the common wire is continuously monitored and only a small current or change in current is required to produce an offset voltage and compensating current sufficient to compensate for the change in potential which occurred at one of the reference points.

Since the compensating circuit is operable to minimize current flow over the common wire which interconnects points of reference potential, it is possible to use a smaller gauge wire for interconnecting equipment at different locations while maintaining the reference points at the different locations at a substantially constant potential.

DESCRIPTION OF A PREFERRED EMBODIMENT

For purposes of illustration, the common wire compensating circuit provided by the present invention is described with reference to an application in an electrical control system which is shown in block diagram form in FIG. 1.

Figure 1:
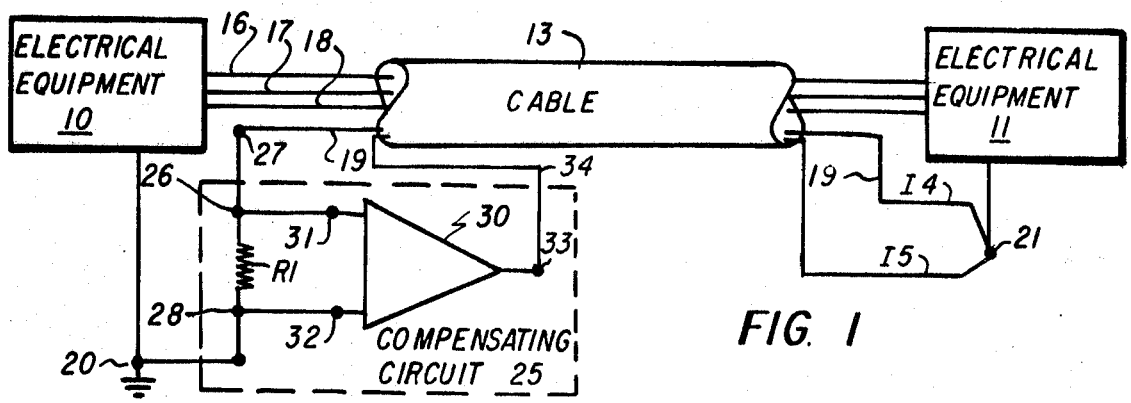
FIG. 1 is a block diagram of an electrical control system having electrical equipment at first and second locations interconnected by a multi-wire cable, and a common wire compensating circuit provided by the present invention for minimizing current flow over a common wire of the multi-wire cable.

Referring to FIG. 1, the electrical control system is shown to include electrical equipment 10 at a first location and further electrical equipment 11 at a second location which are interconnected by a multi-wire cable 13. The electrical equipment 10 may provide control signals for transmission via signal conductors 16–18 which comprise the multi-wire cable 13 to the electrical equipment 11 at the second location. The multi-wire cable 13 includes a common wire 19 which is connected in series with a current sensing resistor R1 between a reference point or system ground 20 for the equipment 10 at the first location and a reference point or terminal 21 for the electrical equipment 11 at the second location.

It is desirable to maintain the potential at reference terminal 21 at the system ground level. Therefore, in accordance with the present invention, a common wire compensating circuit 25 is provided at the first location for sampling current which may flow over the common wire 19 whenever a potential difference exists between reference terminal 21 and the system ground 20. The compensating circuit 25 responsively provides a compensating current through compensating wire 34 which is extended to the reference terminal 21 to minimize current flow over the common wire 19 and thereby reduce the potential difference existing between reference terminal 21 and the system ground 20.

As shown in FIG. 1, the common wire compensating circuit 25 includes resistor R1 which is connected in series with the common wire 19 to enable the current flowing over the common wire 19 to be sampled.

The sensing resistor R1 has a terminal 26 connected to one end 27 of the common wire 19 and a terminal 28 connected to the system ground 20. Current flowing over the common wire 19 and thus through the resistor R1 causes a voltage to appear across the resistor terminals 26 and 28.

The compensating circuit 25 further includes an amplifier circuit 30 having input 31 connected to the resistor R1 for detecting the voltage developed across the resistor R1 in response to current flow over the common wire 19. Amplifier circuit input terminal 31 is connected to terminal 26 of the resistor R1. Terminal 32 of the amplifier circuit 30 is connected to system ground 20 and thus to the second terminal 28 of resistor R1.

Figure 2:
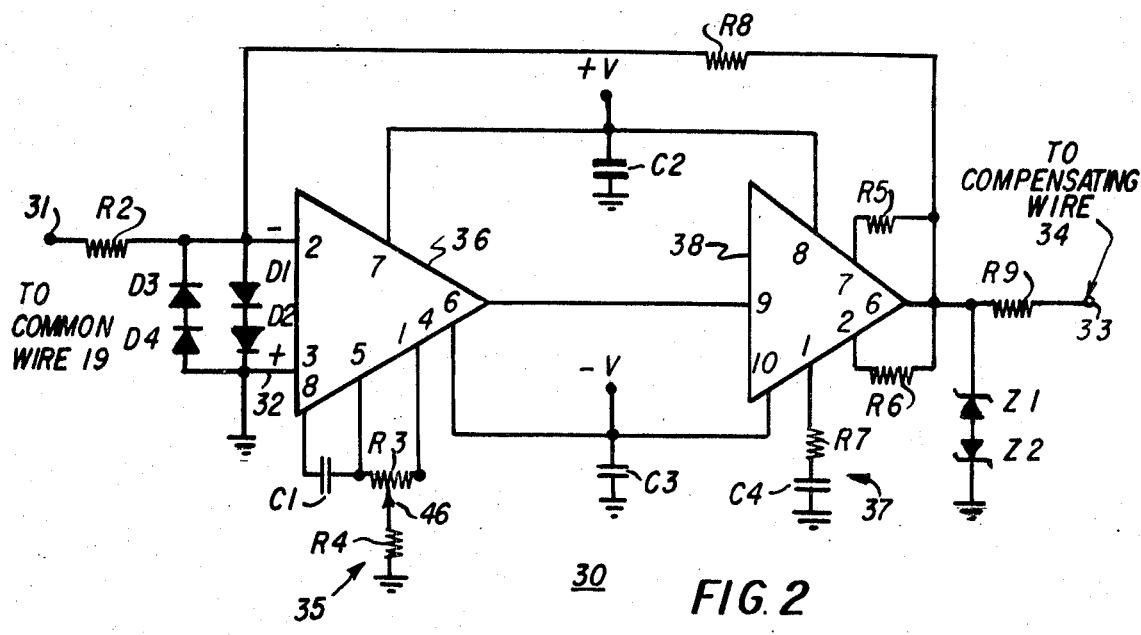
FIG. 2 is a schematic circuit diagram of an amplifier circuit which comprises the common wire compensating circuit shown in FIG. 1.

A schematic circuit diagram of the amplifier circuit 30 is shown in FIG. 2. Amplifier circuit 30 includes an input stage 35 including an operational amplifier 36 and an output stage 37 including a power amplifier 38. A suitable operational amplifier and power amplifier may comprise Model LM-301A commercially available from National Semiconductor, Inc. of Santa Clara, Calif. and Model MC-1438R, commercially available from Motorola Semiconductor.

Operational amplifier 36 has an input terminal 2 connected through a resistor R2 to the input terminal 31 of the compensating circuit 25 and thence to the lead 26 of the sensing resistor R1. The operational amplifier 36 has an input terminal 3, which serves as the other input terminal 32 of the amplifier circuit 30, connected to the system ground 20 as shown in FIG. 1.

A voltage limiting circuit, including diodes D1–D4, is connected between the amplifier input terminals 2 and 3 to limit the amplitude of the signals applied to the amplifier input stage 35. The diodes D1 and D2 are serially connected between input terminal 2 and input terminal 3 of the amplifier 36 in a forward direction and the diodes D3 and D4 are serially connected between the amplifier input terminals 2 and 3 in a reverse direction and in parallel with diodes D1 and D2.

The amplifier 36 includes a potentiometer R3 connected between terminals 4 and 5 of the amplifier 36 and a capacitor C1 connected between terminals 5 and 8 of the amplifier 36 to permit differential balancing and compensation of the differential amplifier 36. A tap 46 of the potentiometer R3 is connected through a resistor R4 to ground.

Power is supplied to the operational amplifier 36 from a positive supply at terminal +V to a terminal 7 of the amplifier 36 and from a negative voltage supply at terminal −V to a further terminal 4 of the amplifier 36.

Filter capacitors C2 and C3 are connected between terminals +V and −V, respectively, and ground.

The output of the amplifier 36 at a terminal 6 is connected to an input terminal 9 of the power amplifier 38 which comprises the output stage 37. The power amplifier 38 amplifies the signals detected by the amplifier 36 and provides an output voltage at a terminal 6 of the power amplifier 38.

The power amplifier 38 includes bias resistors R5 and R6 connected between the output terminal 6 of the amplifier 38 and terminals 7 and 2, respectively, of the amplifier 38. A frequency compensation circuit comprised of the series connection of a resistor R7 and a capacitor C4 is connected between a terminal 1 of the amplifier 38 and ground.

Power is supplied to the power amplifier 38 from the positive voltage supply to a terminal 8 of the amplifier 38 and from a negative voltage supply −V to a terminal 10 which is the case of amplifier 38.

A feedback resistor R8 is connected between the output terminal 6 of the power amplifier 38 and the input terminal 2 of the operational amplifier 36. The overall gain of the amplifier circuit 30 is determined by the ratio of the feedback resistor R8 to the resistor R2 connected to the input terminal 2 of the amplifier 36.

It is pointed out that it is desirable that the gain of the amplifier circuit 30 be as large as possible within the limits of stability of the amplifier circuit. A typical value for the gain of the amplifier circuit is 1000.

The output of the power amplifier 38 at terminal 6 is extended over resistor R9 to the output terminal 33 of the amplifier circuit 30 which in turn is connected via the compensating wire 34 to the reference terminal 21 as shown in FIG. 1. A pair of Zener diodes Z1 and Z2 are connected back-to-back between the output terminal 6 of the amplifier 38 and ground to protect power amplifier 38 from damaging voltage transients which may be induced into the line. The resistor R9 provides current limiting for Zener diodes Z1 and Z2. The Zener diodes may be of the type IN967B which are commercially available from Motorola Semiconductor.

OPERATION OF THE COMPENSATING CIRCUIT

In response to the inter-operation of the electrical equipment 10 at the first location and the electrical equipment 11 at the second location through wires 16–18 (there may be any number of wires), large currents may flow from the reference terminal 21 to system ground 20 via the common wire 19 and resistor R1. Due to the resistance of the common wire 19, there will be a corresponding shift in potential at the reference terminal 21 relative to the system ground 20. In an exemplary embodiment, the common wire 19 may comprise 10,000 feet of 22 gauge wire.

Without compensation as is afforded by the common wire compensating circuit 25 of the present invention, the potential at the reference terminal 21 could rise, for example, to approximately 5 volts above the system ground level in response to current on the order of 30 milliamperes flowing over the common wire 19.

However, for an electrical system which employs the common wire compensating circuit 25 the magnitude of the current flowing over the common wire would be limited to approximately 0.5 milliamperes, and correspondingly, the shift in potential at the reference terminal 21 would be limited to approximately 0.1 volt.

Thus, in the present example, when the current in the common wire 19 begins to increase due to increased interaction between electrical equipment 10 and electrical equipment 11, there is an increase in current through sensing resistor R1. Resistor R1 may, for example, be a ten ohm resistor. The increase in current through sensing resistor R1 results in an increase in voltage between input terminals 31 and 32 of the amplifier circuit 30. The voltage at output 33 increases a sufficient magnitude to produce a current $I_5$ in compensating wire 34 such that the current gain ($I_5/I_4$) equation for the network is satisfied.

$$\frac{I_5}{I_4} = \frac{R \text{ common wire } 19}{R \text{ comp. wire } 34 + R9} + \frac{R1(R2+R8)}{(R \text{ comp. wire } 34 + R9)(R1+R2)}$$

The resistance of common wire 19 and of compensating wire 34 may be on the order of 150 ohms, if, for example, each consists of 10,000 feet of No. 22 gauge wire. For values of $R1 = 10$ ohms, $R2 = 100$ ohms, $R8 = 100K$ ohms, and $R9 = 10$ ohms, the current gain of the network is approximately 60. Therefore, the current in common wire 19 is approximately one-sixtieth of the current in compensating wire 34. If the total current required to flow between reference terminal 21 of electrical equipment 11 and ground terminal 20 of electrical equipment 10 is 30 milliamperes, approximately 0.5 milliamperes will flow through common wire 19 and slightly less than 30 milliamperes will flow through compensating wire 34. The voltage at reference terminal 21 will be less than 0.1 volt with respect to ground terminal 20. The output voltage of the compensating circuit must be approximately −4.5 volts to supply the required current through the compensating wire.

If the common current were required to flow from ground terminal 20 to reference terminal 21 due to the polarity of signals on the signal wires 16–18, the voltage provided at the input terminals 31 and 32 of amplifier 30 would be of polarity such as to produce a positive output voltage at output 33 and, hence, the correct direction of current in compensating wire 34.

It is pointed out that due to the high gain of amplifier circuit 30, only a small amount of current (or current change) in the common wire 19, and resistor R1 connected in series therewith, is required to provide the necessary compensating wire current to maintain a very small potential difference between the reference points at the two locations.

I certain installations wherein more than two remote stations are required to have stable reference points interconnected with the ground reference at the central station 10, additional compensating circuits, such as circuit 25, would be provided for the individual common wires which would connect the reference points for equipment at different locations.

I claim:

1. In an electrical system including electrical equipment at different locations and a multi-wire cable interconnecting the equipment at the locations, compensating means for minimizing the potential difference between a reference terminal at a first one of the locations and a system ground at a second one of the locations comprising in combination common wire means connected between said reference terminal and said system ground for conducting current whenever a potential difference exists between said reference terminal and said system ground, means at said second location responsive to current conducted by the common wire means to provide a compensating current which is proportional to the amplitude of the current conducted by common wire means, and means for extending the compensating current to said reference terminal to thereby minimize current flow in said common wire means and in turn the potential difference between said reference terminal and said system ground.

2. In an electrical system including electrical equipment at different locations and a multi-wire cable interconnecting the equipment at the locations, the combination comprising current sensing means connected in series with a common wire of said multi-wire cable between a reference terminal which provides a point of reference potential for electrical equipment at a first one of the locations and a system ground which provides a point of reference potential for electrical equipment at a second one of said locations, said current sensing means providing a voltage proportional to current flowing in the common wire and said current sensing means whenever a potential difference exists between said reference terminal and said system ground, voltage detecting means at said second location having inputs connected to said current sensing means and responsive to the voltage provided by the current sensing means to provide a compensating current at an output of said voltage detecting means, and compensating wire means connected between the output of said voltage detecting means at said second location and said reference terminal at said first location for extending the compensating current to said reference terminal to minimize current flow in said common wire and said current sensing means and thus the potential difference between said reference terminal and said system ground.

3. A system as set forth in claim 2 wherein said current sensing means includes resistance means connected in series with said common wire.

4. A system as set forth in claim 3 wherein said voltage detecting means includes amplifier means having inputs connected across said resistance means and an output connected to the output of said voltage detecting means, said amplifier means being responsive to a voltage provided across said resistance means in response to current flow over said common wire and said resistance means to provide said compensating current at the output of said voltage detecting means.

5. A system as set forth in claim 4 wherein said amplifier means includes means for biasing said amplifier means for operation as a high gain amplifier whereby said amplifier means is enabled to provide a relatively high output current in response to a small current flowing in the common wire and said resistance means.

6. A system as set forth in claim 4 wherein said amplifier means comprises an input stage including an operational amplifier having inputs connected across said resistance means and an output, and an output stage including a power amplifier having an input connected to the output of said operational amplifier and an output connected to the output of said voltage detecting means.

* * * * *